United States Patent [19]
King

[11] Patent Number: 5,474,387
[45] Date of Patent: Dec. 12, 1995

[54] AXLE BEARING POSITIONING SYSTEM

[75] Inventor: Christopher D. King, Santa Barbara, Calif.

[73] Assignee: King Cycle Group, Santa Barbara, Calif.

[21] Appl. No.: 233,515

[22] Filed: Apr. 26, 1994

[51] Int. Cl.[6] .............................. F16C 43/04; F16C 9/02; F16M 3/00
[52] U.S. Cl. .................. 384/458; 74/594.2; 384/545; 384/585; 403/367; 403/370
[58] Field of Search ..................... 384/458, 519, 384/537, 538, 540, 542, 544, 545, 583, 584, 585; 74/594.1, 594.2; 403/370, 368, 367

[56] References Cited

U.S. PATENT DOCUMENTS

| | | | |
|---|---|---|---|
| 579,307 | 3/1897 | Skarin | 384/458 |
| 619,499 | 2/1899 | Penseyres | 74/594.2 |
| 658,624 | 9/1900 | Egger | 74/594.1 |
| 1,251,783 | 1/1918 | Jones | 384/544 |
| 3,903,754 | 9/1975 | Morroni | 74/594.1 |
| 4,545,691 | 10/1985 | Kastan et al. | 384/458 |
| 5,181,437 | 1/1993 | Chi | 384/545 X |
| 5,209,581 | 5/1993 | Nagano | 384/540 X |
| 5,281,003 | 1/1994 | Herman | 301/2.5 |

FOREIGN PATENT DOCUMENTS

| 412445 | 4/1925 | Germany | 384/585 |
|---|---|---|---|

*Primary Examiner*—Thomas R. Hannon
*Attorney, Agent, or Firm*—Marvin E. Jacobs

[57] ABSTRACT

A bicycle pedal crank bearing system has a hollow axle within which expandable cone shaped discs are flattened so as to expand radially outward and expand the axle into locking engagement with a thrust sleeve surrounding the axle. Since the thrust sleeve can not move axially relative to the bearing, the axle is likewise axially positioned, but is still free to rotate. The chain path is, thus, easily aligned and access to the bearings for maintenance is made easier.

13 Claims, 2 Drawing Sheets

5,474,387

AXLE BEARING POSITIONING SYSTEM

TECHNICAL FIELD

This invention pertains to the field of bearings for axles and means to adjust the location of the axles, especially such bearings as are used with pedal driven crank axles in bicycles, exercise machines, paddle boats, and the like.

BACKGROUND OF THE INVENTION

Typical foot operated crank systems allow leg motion to be converted to rotational motion. The standard design mounts foot pedals at the end of crank arms at opposite ends of an axle. A sprocket is usually fastened to the axle to engage a roller chain which transfers the rotary motion to a rear wheel, in the case of a bicycle, or other driven device for other prior art applications.

For low friction, the axle is mounted for near effortless rotation in roller bearings. The roller chain must also be kept in exact alignment with the drive sprocket to insure against power robbing drag and derailment. Since the rear wheel and its sprocket are adjustable, and since bicycle frames may be slightly bent, the pedal driven sprocket should be adjustable to maintain chain alignment. Several solutions to this requirement have been tried in the prior art.

Some designs place fixed thickness washers between the bicycle frame and the axle bearing retainers to shift the axle in crude steps that only approximate the correct chain alignment. This requires removal of the crank arms, taking the axle out of the frame, switching washers, and reassembling the entire collection of parts several times to search for the best alignment in a clumsy trial and error approach. Other designs uses a separate sealed bearing assembly. The entire assembly is mounted in a threaded hole in the bicycle frame, with threaded rings at each end, so that the entire assembly can be threaded axially to the desired position. But the crank arms must be removed to put a wrench on the threaded rings and the sealed bearings can not be replaced or maintained. Repair necessitates throwing away the entire bearing assembly, axle and all.

Still another prior art design uses a sleeve about the center of the axle that rests against the inner faces of the bearings. The sleeve may be locked to the axle with a set screw or snap rings. But again, adjustment requires complete disassembly of the bearing. The present invention avoids the above described problems as described hereinafter.

STATEMENT OF THE INVENTION

Briefly, my invention contemplates an annular thrust sleeve sized to fit closely about the axle. The thrust sleeve can rotate freely in the bearing housing, but is fixed against sideways movement in the axial direction in the bearing housing. The axle is hollow and contains within a radial expansion wedge or jacking means that can be expanded radially outward by a threaded screw that is positioned along the central axis of the axle. Thus, by merely inserting a screwdriver or allen type wrench through a hole in the end of the axle, the expansion jack can be moved radially outward to expand either a locking pin or part of the axle itself against the thrust sleeve. This locks the axle in the desired axial position without having to take the bearing apart. Furthermore, the axle can be quickly and easily released and slid out of the thrust sleeve for lubrication or replacement of the bearings. Numerous other benefits and advantages will become apparent upon consideration of the following detailed description and the drawing referenced thereby.

DETAILED DESCRIPTION OF THE INVENTION

Figure 1:
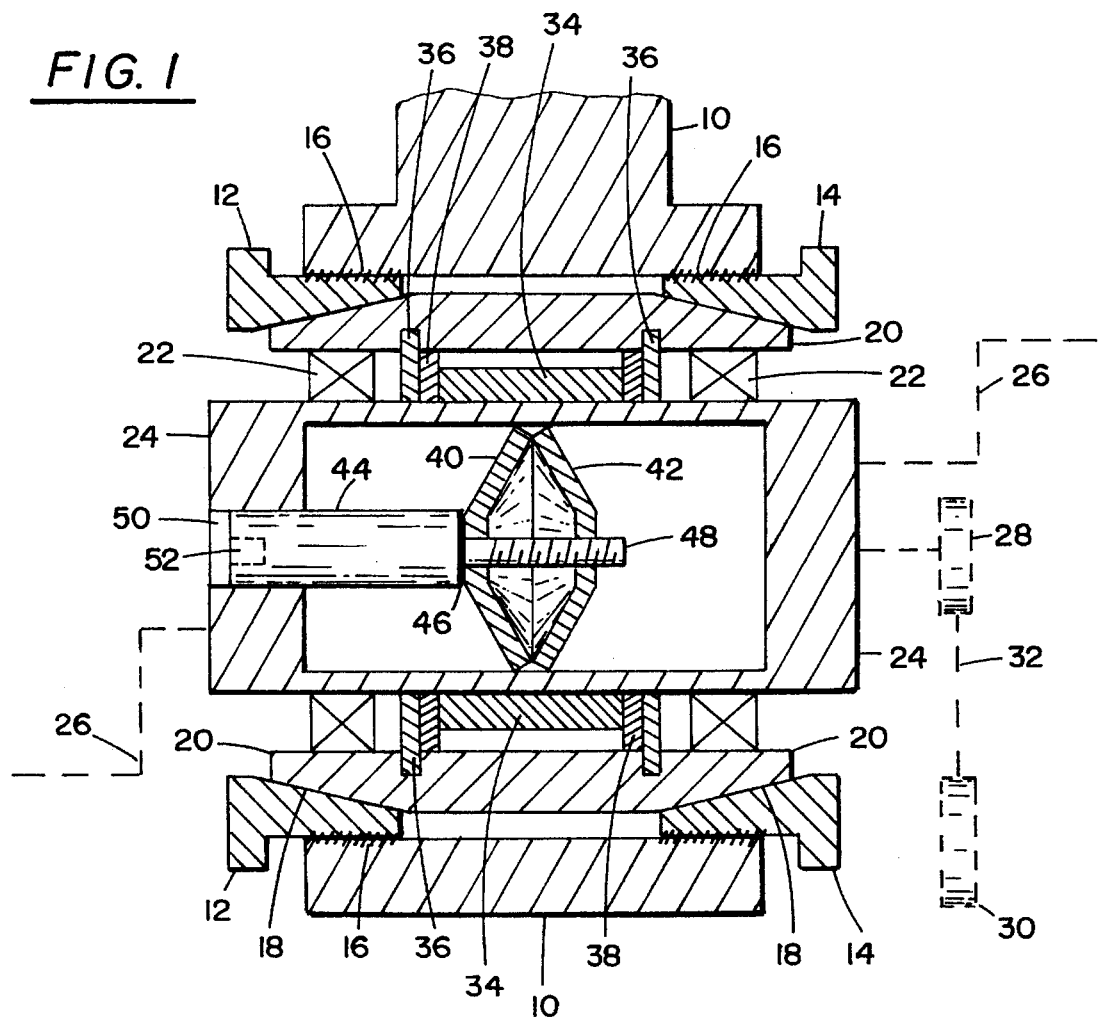
FIG. 1 is a sectional schematic depiction of the expandable axle bearing positioning system of the present invention showing one embodiment of the wedge or expansion mechanism inside the axle and also showing the thrust sleeve axially located by snap rings in the bearing housing.

In FIG. 1, a fragment of a bicycle frame 10 is shown in section. This part of the bicycle is usually called the bottom bracket shell. Frame or shell 10 has an internally threaded hole therethrough into which two externally threaded rings 12 and 14 may be screwed. The threads are schematically symbolized with hash marks 16. Rings 12 and 14 have tapered bores which grip and secure similar matching tapers on the outside circumference of a bearing housing 20. A pair of annular roller bearings 22 fit tightly inside the bearing housing 20. Bearings 22 may be located and protected by additional rubber seals, in a manner well known to those skilled in the art, but these are omitted from the drawing for clarity.

Roller bearings 22 support an axle 24 for rotation therewithin. The axle 24 is rotated with conventional crank mounted pedals which are symbolized by dashed lines 26. Also mounted to axle 24, at one end, is a sprocket 28 which drives a rear wheel sprocket 30 by means of a roller chain 32, all schematically illustrated with dashed lines due to their well known construction.

Encircling axle 24 is a thrust sleeve 34 captured and axially located between snap rings 36 and thrust washers 38. Thrust sleeve 34 rotates freely inside bearing housing 20, but can not move in a lateral or axial direction because of snap rings 36 which rest in grooves in the inside surface of housing 20.

Axle 24 has a smooth cylindrical outer surface and, thus, may be slid axially in bearings 22, thrust sleeve 34, snap rings 36, and washers 38 until sprockets 28 and 30 are nicely aligned, and chain 32 follows a straight path. At this position, axle 24 is locked to the axially fixed thrust sleeve 34 with the inventive expansion means disposed within the hollow interior of axle 24.

The radial expansion jack or wedge comprises, in FIG. 1, a pair of cone shaped discs 40 and 42 which are thin enough to be flexible. A screw 44 has a shoulder 46 and a lesser diameter threaded portion 48 that extends through a hole in the center of disc 40 and threads into a threaded hole in the center of disc 42. To lock the axle laterally, one inserts a suitable tool through a hole 50 in the end of axle 24, into a slot 52, to rotate screw 44. This action pushes disc 40 and pulls disc 42 so that the central portions of the discs are drawn toward each other. The flattening of cone shaped discs 40 and 42 causes them to expand radially outward, pushing out the relatively thinner middle part of the axle walls against thrust sleeve 34. Axle 24 is, therefore, solidly locked to sleeve 34 and, accordingly, axially fixed.

At any time that the chain 32 should become misaligned, no disassembly of the bearing, pedals, or sprockets is needed, unlike the prior art. Screw 44 is merely withdrawn, the discs 40 and 42 contract, and axle 24 relaxes away from sleeve 34. Axle 24 is then moved to realign chain 32, and screw 44 retightened.

An additional advantage of the present design is that the tapered bores 18 allow a gross axial adjustment of the bearing housing 20 upon initial assembly. Still further, with the passage of time, bearings 22 can wear a bit in the radial direction. This slack can be taken up with further tightening of rings 12 and 14 so as to squeeze housing 20 radially inward to compensate for the slightly lesser diameter of worn bearings 22.

Another advantage of the present invention is easier maintenance and service. With screw 44 loosened, and the left crank arm 26 removed, the entire assembly of axle 24, sprocket 28, and right crank 26 can be slid to the right and removed completely from housing 20. This allows bearings 22 to be quickly and easily inspected, cleaned, lubricated, and replaced.

Figure 2:
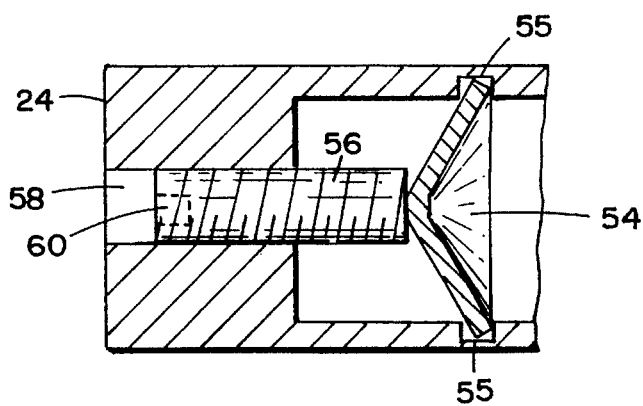
FIG. 2 is a fragmentary view of a part of the FIG. 1 depiction showing another embodiment of the expansion means.

FIG. 2 shows another embodiment of the invention in which the expansion means inside axle 24 comprises only one cone shaped disc 54. Disc 54 is held in place by having its outside edge recessed into a groove 55 in the interior wall of axle 24. A screw 56 is threaded into a threaded hole 58 in the end of axle 24. Rotation of screw 56 with a tool inserted into slot 60 will advance screw 56 against the center of disc 54, flattening disc 54, and expanding disc 54 radially outward to likewise expand axle 24, locking it against thrust sleeve 34.

Figure 3:
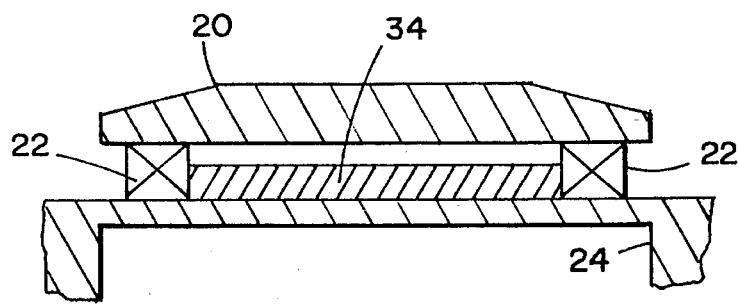
FIG. 3 is another fragmentary view of a part of FIG. 1 in which the thrust sleeve is axially located by the bearings instead of snap rings.

FIG. 3 shows another embodiment of the invention in which thrust sleeve 34 is axially located by the bearings 22 rather than the snap rings 36 shown in FIG. 1. This design would be less costly, using fewer parts and less machining. However the bearings 22 are subjected to a side loading.

Figure 4:
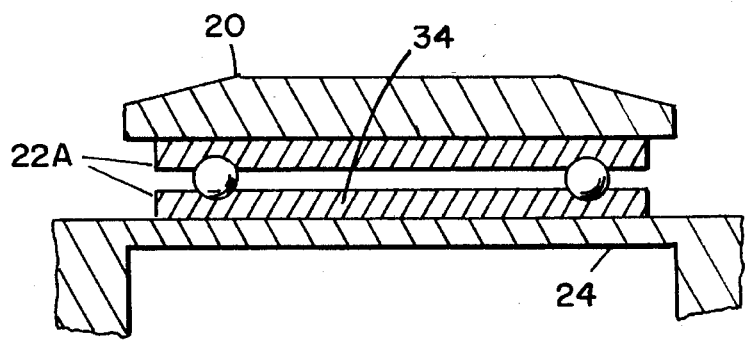
FIG. 4 is a fragmentary view similar to FIG. 3 except that the thrust sleeve comprises a wide double row bearing so that the bearings and thrust sleeve are combined into a unified structure.

FIG. 4 shows another embodiment in which the thrust sleeve is an integrated part of a wide double row bearing 22A. With this arrangement, expansion means inside axle 24 force the axle outward against the bearing itself, rather than a separate thrust sleeve captured between two bearings.

Figure 5:
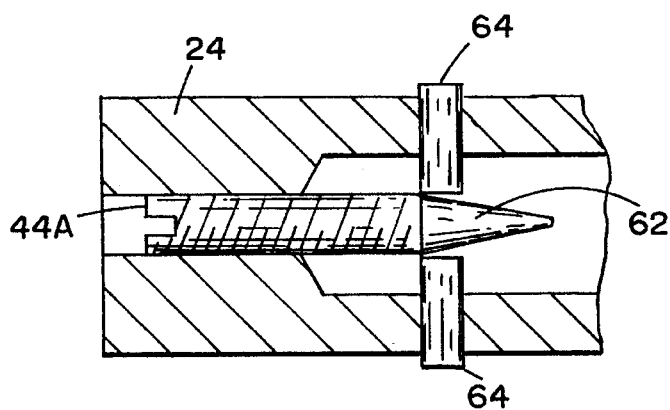
FIG. 5 shows a fragmentary drawing of another embodiment of the expansion means in which a cone shaped screw forces locking pins radially outward against the thrust sleeve.

Many other types of expanding devices inside axle 24 can be designed that would remain within the spirit and scope of the invention. For example, FIG. 5 is a fragmentary drawing showing a screw 44A with a tapered conical point 62 at the right end that wedges between radially movable pins 64 disposed around the conical point. As the screw advances, it forces pins 64 radially outward to expand out against the thrust sleeve 34. Instead of pins 64, balls could be used. In still another variation, the axle itself could be machined to have inwardly extending portions that would contact, and be expanded by, cone shaped screw 44A.

Another variation might involve varying the wall thickness of the hollow axle to be thinner and more flexible near the center, where it contacts the thrust sleeve, and thicker nearer the ends for greater strength. Thrust sleeve 34 could also have a variable thickness, being thicker at the ends that contact washers 38 or bearings 22, and thicker in the middle near discs 40 and 42, and thinner elsewhere to be lighter and trap more lubricant. With these and many other possible variations, we intend to be limited not to the specific arrangements shown in the drawings, but only by the appended claims and their equivalents.

I claim:

1. An axle bearing positioning system comprising in combination:

generally cylindrical bearing housing means, adapted to be mounted in a surrounding support frame, and having a central axis;

annular bearing means located inside said housing means;

annular thrust sleeve means axially located inside said housing means so as to be free to rotate freely about said central axis but restrained against movement parallel to said central axis; and an axle adapted to rotate within said bearing means and said thrust sleeve means, said axle being free to move axially in a direction parallel to said central axis and relative to said bearing means and said thrust sleeve means, said axle having an expansion means inside adapted to expand against the thrust sleeve means so as to lock the axle to the thrust sleeve means and thereby restrain said axle against movement parallel to said central axis.

2. The system of claim 1 in which said expansion means includes a screw means that is accessible from the end of said axle, rotation of said screw means controlling the expansion and contraction of said expansion means.

3. The system of claim 2 in which said thrust sleeve means is axially located by said annular bearing means.

4. The system of claim 2 in which said thrust sleeve means comprises a portion of said annular bearing means.

5. The system of claim 2 in which said expansion means comprises locking pins disposed in holes in said axle, said screw means having a conical shaped end positioned to push the locking pins against the thrust sleeve means upon rotation of said screw means.

6. An axle bearing positioning system comprising in combination:

generally cylindrical bearing housing means, adapted to be mounted in a surrounding support frame, and having a central axis;

annular bearing means located inside said housing means;

annular thrust sleeve means axially located inside said housing means so as to be free to rotate freely about said central axis but restrained against movement parallel to said central axis;

an axle adapted to rotate within said bearing means and said thrust sleeve means, said axle having an expansion means inside adapted to expand against the thrust sleeve means so as to lock the axle to the thrust sleeve means;

said expansion means including a screw means that is accessible from the end of said axle, rotation of said screw means controlling the expansion and contraction of said expansion means; and snap rings resting in annular grooves in the interior surface of said housing means so as to resist axial movement of said thrust sleeve means.

7. An axle bearing positioning system comprising in combination:

generally cylindrical bearing housing means, adapted to be mounted in a surrounding support frame, and having a central axis;

annular bearing means located inside said housing means;

annular thrust sleeve means axially located inside said housing means so as to be free to rotate freely about said central axis but restrained against movement parallel to said central axis;

an axle adapted to rotate within said bearing means and said thrust sleeve means, said axle having an expansion means inside adapted to expand against the thrust sleeve means so as to lock the axle to the thrust sleeve means;

said expansion means including a screw means that is accessible from the end of said axle, rotation of said screw means controlling the expansion and contraction of said expansion means; and said expansion means further comprising a pair of cone shaped discs, the peripheral edges of said discs contacting the inside surface of the axle walls, and said screw means connected to the centers of said discs so as to be operable to flatten and expand said discs radially outward and push the walls of the axle radially outward against said thrust sleeve means.

8. An axle bearing positioning system comprising in combination:

generally cylindrical bearing housing means, adapted to be mounted in a surrounding support frame, and having a central axis;

annular bearing means located inside said housing means;

annular thrust sleeve means axially located inside said housing means so as to be free to rotate freely about said central axis but restrained against movement parallel to said central axis;

an axle adapted to rotate within said bearing means and said thrust sleeve means, said axle having an expansion means inside adapted to expand against the thrust sleeve means so as to lock the axle to the thrust sleeve means;

said expansion means including a screw means that is accessible from the end of said axle, rotation of said screw means controlling the expansion and contraction of said expansion means; and said expansion means further comprising a cone shaped disc, said disc fixably located on the interior surface of the axle walls, and said screw means is connected to the center of said disc, said screw means being threaded in a hole in the end of the axle so that rotation of the screw means flattens and expands said disc.

9. The system of claim 8 in which said disc is fixably located on said interior walls by having the peripheral edge of said disc resting in an annular groove in the interior surface of the axle walls.

10. An axle bearing positioning system comprising in combination:

generally cylindrical bearing housing means, adapted to be mounted in a surrounding support frame, and having a central axis;

annular bearing means located inside said housing means;

annular thrust sleeve means axially located inside said housing means so as to be free to rotate freely about said central axis but restrained against movement parallel to said central axis;

an axle adapted to rotate within said bearing means and said thrust sleeve means, said axle having an expansion means inside adapted to expand against the thrust sleeve means so as to lock the axle to the thrust sleeve means;

said expansion means including a screw means that is accessible from the end of said axle, rotation of said screw means controlling the expansion and contraction of said expansion means; and threaded, tapered, locking rings adapted to fit between said frame and said bearing housing, rotation of said rings being operable to both support said housing in said frame, and compress said bearing housing to compensate for wear in the bearing means.

11. The system of claim 1 in which said expansion means further comprises a pair of cone shaped discs, the peripheral edges of said discs contacting the inside surface of the axle walls, and said screw means connected to the centers of said discs so as to be operable to flatten and expand said discs radially outward and push the walls of the axle radially outward against said thrust sleeve means.

12. The system of claim 10 in which said expansion means further comprises a cone shaped disc, the peripheral edge of said disc located at a fixed location on the interior surface of the axle walls, and said screw means is connected to the center of said disc, said screw means being threaded in a hole in the end of the axle so that rotation of the screw means flattens and expands said disc.

13. The system of claim 12 in which said disc is located at a fixed location by having the peripheral edge of said disc resting in an annular groove in the interior surface of the axle walls.

* * * * *